1] United States Patent [19]
Bower et al.

[11] 4,268,473
[45] May 19, 1981

[54] ALUMINUM-FILLED EPOXY EMBOSSING CAUL AND MEANS FOR PRODUCTION

[75] Inventors: Richard K. Bower, New Milford, Conn.; August H. Rauch, Stayton; John F. Richard, Lebanon, both of Oreg.

[73] Assignee: Champion International Corporation, Stamford, Conn.

[21] Appl. No.: 955,584

[22] Filed: Oct. 30, 1978

Related U.S. Application Data

[63] Continuation of Ser. No. 824,827, Aug. 15, 1977, abandoned.

[51] Int. Cl.³ .............................................. B29C 25/00
[52] U.S. Cl. ............................... 264/234; 260/37 EP; 428/251
[58] Field of Search ....................... 260/37 EP, 37 M; 428/251, 417; 264/331, 234

[56] References Cited

U.S. PATENT DOCUMENTS

| 3,455,949 | 7/1969 | Porret | 260/37 EP |
| 3,481,822 | 12/1969 | Wilson | 428/251 |
| 3,641,228 | 2/1972 | Fleck | 264/225 |

Primary Examiner—Paul R. Michl
Attorney, Agent, or Firm—Evelyn M. Sommer

[57] ABSTRACT

A press caul suitable for embossing wood panels to produce textured wood surface designs is described. This caul is made by casting liquid, epoxy resin filled with aluminum powder against a panel surface bearing a textured design and applying sufficient heat to cure at least partially. The product caul may then be separated for use.

If the desired degree of curing is not reached in the molding step, the caul may be baked. This ensures the permanency of the applied relief. In a further optional embodiment, the resin may contain a plurality of sheets of embedded fiberglass fabric to provide reinforcement.

7 Claims, 5 Drawing Figures

Fig. 1.

ALUMINUM-FILLED EPOXY EMBOSSING CAUL AND MEANS FOR PRODUCTION

This is a continuation of application Ser. No. 824,827 filed Aug. 15, 1977 now abandoned.

BACKGROUND OF THE SUBJECT INVENTION

In order to upgrade or improve the appearance of low or undesirable quality wood panel surfaces, particularly with respect to paint adhesion or durability, such surfaces are often covered with an overlay or resin impregnated sheet of paper. The resultant panel, however, usually has a smooth, somewhat uninteresting appearance. It has therefore also been common to incorporate a texture or relief to the overlay panel surface, thereby lending a three-dimensional effect.

One method used to provide such a three-dimensional effect is the machining of grooves into the surface of the panel. However, in addition to the high costs incurred in the machining operation, the grooves formed in the panel by such machining contain areas of exposed wood which present problems of paint durability. In addition, an extensive or overall textured pattern is not provided by such machining.

Because of the shortcomings of machining, a technique whereby wood grain textures are embossed onto wood surfaces has been preferred. In this procedure, a caul having the desired texture or design and the panel sought to be embossed are placed between the platens of a hot press. The caul and panel are compressed under heat and pressure, so that the panel takes on and retains the relief impression of the caul.

Heretofore cauls made of metal, generally mild steel, aluminum or nickel, have been employed in a platen press for embossing. These cauls are generally textured or provided with the desired configuration by one of several manufacturing techniques. The most common technique involves the construction of a hardened metallic master tool, from which a number of individual cauls can be fashioned from relatively softer metals by the combined application of pressure and an acid etching agent. Another method involves the application of an etching agent to specified areas of a metallic surface, resulting in controlled removal of metal from the surface to produce a desired texture. Still another technique involves caul formation by electrochemical deposition of nickel onto a textured surface which has been coated with an electrically conductive primer. Lastly, there is a technique whereby a textured caul plate is formed by pouring molten aluminum into a suitable mold (sand casting).

It can readily be appreciated that in addition to the cost of the metal, the cost of producing a desired texture by any of the aforementioned techniques is relatively expensive. This cost of manufacturing tends to limit the number of different caul designs that a manufacturer can afford to use. This is obviously a significant limitation when one considers the number of potential designs that are available. It can also be appreciated that some of the methods by which metal cauls are produced—i.e. etching and casting—often yield a less than genuine reproduction of a wood grain or other texture. Another shortcoming attendant with the commercial metal cauls currently available is that they are somewhat heavy and can be difficult to handle, especially during installation and removal from a hot press.

SUMMARY OF THE INVENTION

In accordance with the present invention, a press embossing caul is prepared from an aluminum-filled epoxy resin. The cauls have a relief of a textured design on one surface and comprise cured, aluminum-filled resin. Optionally, they may also contain an embedded plurality of fabric layers, such as glass fiber cloth, for reinforcement.

The cauls may be formed by various means. Most simply, the liquid, filled-epoxy resin is poured onto the textured—i.e. three dimensional—design surface sought to be duplicated. In this embodiment, a mold—the surface of which is the design panel—is ordinarily loaded with filled resin. The resin might then be leveled by any suitable means. The resin is then subjected to heat sufficient to cause the resin to solidify by curing at least partially. After this first mold step, the caul may be separated from the mold for use.

If complete curing is not effected during the first mold step, the caul may be baked to insure optimum strength and retention of its relief textured design. During molding the caul is usually cured to a "B-stage" state. Molding can also be carried out at times and temperatures sufficient for complete curing of the epoxy resin. Ordinarily, however, it is preferred to place the caul in a hot-press where it may be maintained for at least about 350° F. and one hour. Although such baking conditions obviously depend upon the degree to which curing is effected during the molding step, the conditions for curing and/or baking are conventional and vary in accordance with specific epoxy resin utilized.

Where fabric reinforced cauls are desired, the process of production is only slightly altered. Here, it is preferred to layer into the mold, a plurality of fabric sheets of, for example, fiberglass which have already been impregnated with the filled resin. These sheets are preferably layered without overlap of their edge portions. When the layers of the impregnated fabric are heated, the plies of layered fabric bond together. The caul may then be further processed as already described.

A finished press caul, which must be heat resistant to a temperature of about 270° F. to 320° F. (the temperature customarily encountered in use), is suitable for embossing plywood or similar panels, preferably ones bearing an overlay to produce simulations of textured wood on their surfaces.

DRAWINGS

The drawings consist of a series of graphs. They will be discussed in more detail in the following detailed description of the invention.

DETAILED DESCRIPTION

According to the present invention, there are provided cauls for embossing plywood panels, particle board, and similar board products, preferably ones surfaced with a paper overlay. These cauls consist of, or comprise cured epoxy resin filled with aluminum powder. They are normally essentially rectangular in shape, bearing a textured design on one surface.

Suitable epoxy resins are derived from, for example, polyhydric phenols and halohydrins. They are generally prepared in an alkaline medium, e.g. an alkali metal hydroxide. Typical and preferred polyepoxides are those prepared by reacting polynuclear phenols, such as 2,2-bis(4-hydroxyphenyl)propane (Bisphenol A), 2,2-bis(4-hydroxyphenyl)butane, bis(4-hydroxyphenyl)e- thane, 2,2-bis(4-hydroxyphenyl)pentane, and the like, with an epihalohydrin, including such as epichlorohydrin, epibromohydrin, 3-chloro-1,2-epoxybutane, 3-bromo-1,2-epoxybutane, 3-bromo-1,2-epoxyhexane and the like.

The polyhydric phenols contemplated herein for preparing polyepoxides of the general type suitable for use in the present invention may be further demonstrated by the formula:

wherein the phenolic moieties may be in any of the 2,2'-, 2,3'-, 2,4'-, 3, 3', 3,4'-, or 4,4'- positions on the aromatic-nuclei, and each of $R^1$ and $R^2$ represents hydrogen, an alkyl group, such as methyl, ethyl, propyl, isopropyl, butyl, sec-butyl, tert-butyl, pentyl, isopentyl, hexyl, isohexyl, and the like; a cyclo(lower) alkyl group, such as a cyclohexyl or substituted cyclohexy group, e.g., methyl-, ethyl-, propyl-, butyl-, pentyl-, and hexyl-substituted cyclohexyl; or an aromatic group, such as phenyl, tolyl, xylyl, and the like. In addition, the phenolic rings may have other substituents besides the hydroxyl groups, for example, lower alkyl groups containing from 1 to 4 carbon atoms, e.g., methyl, ethyl, propyl, isopropyl, butyl and tertiary butyl; halogen atoms, e.g., fluorine, chlorine, bromine or iodine; and the like.

An illustrative but by no means exhaustive listing of dihydric phenols falling with the general formula includes 4,4'-dihydroxydiphenyldimethylmethane (Bisphenol A), 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, ▪,4'-dihydroxydiphenylbutylphenylmethane, 2,2'-dihydroxydiphenylditolylmethane, 4,4'-dihydroxydiphenyltolylmethylmethane, and the like.

Other polyhydric phenols which may also be co-reacted with an epihalohydrin to provide suitable resinous epoxy polyesters are such compounds as resorcinol, hydroquinone, substituted hydroquinones, e.g., p-tert. butyl hydroquinone, and the like, indanols and polyhydric phenols having two hydroxy aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol itself with a phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among other polyhydric alcohols which can be co-reacted with an epihalohydrin to provide suitable resinous epoxy polyesters are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylol propane, mannitol, sorbitol, erythritol, pentaerythritol, their dimers, trimers, and high polymers, e.g., polyethylene glycols, polypropylene glycols, triglycerol, dipentaerythritol and the like, polyallyl alcohol, polyvinyl alcohol, polyhydric thioethers, such as 2,3'-dihydroxydiethyl sulfide, 2,2', 3,3'-tetrahydroxydipropyl sulfide, and the like, mercapto alcohols, such as α-monothioglycerol, α,α'-dithioglycerol, and the like, polyhydric alcohol partial esters, such as monostearin, pentaerythritol monoacetate and the like, and halogenated polyhydric alcohols, such as the monochloridrins of glycerol, sorbitol, pentaerythritol, and the like.

A related class of polymeric polyepoxides which can be used in the practice of the present invention comprises the polyepoxypolyhydroxy polyethers obtained by reacting, again preferably in alkaline medium, a polyhydric phenol, such as Bisphenol A, resorcinol, catechol, and the like, or a polyhydric alcohol, such as glycerol, sorbitol, pentaerythritol and the like, with a polyepoxide, such as bis(2,3-epoxypropyl)ether, bis(2,3-epoxy-2-methylpropyl)ether, 1,2-epoxy-4,5-epoxypentane, and the like.

Still other representative polyepoxides within the purview of the present invention are the following: divinyl benzene dioxide, bis(2,3-epoxy-cyclopentyl)ether, epoxy ethers of polybasic acids, such as diglycidyl succinate, diglycidyl adipate, diglycidyl maleate, diglycidyl phthalate, diglycidyl hexachloroendomethylenetetrahydrophthalate and diglycidyl 4,4'-isopropylidenedibenzoate, and the like.

Other examples of polyhydric phenol reactants and polyepoxide products may be found, for example, in U.S. Pat. Nos. 3,470,128 and 3,705,872.

As the aluminum filler for the epoxy resin, commercially available aluminum powders may be used. Preferably, aluminum should be in the form of atomized powders, rather than leafing or non-leafing flake powders, because the atomized powders are easier to mix with the epoxy resin component. Their average particle sizes are preferably between about 3 to 50, most preferably 5 to 20 microns.

The amount of aluminum powder to be used may be up to about 400%, based upon the weight of uncatalyzed expoxy resin. The powder is provided chiefly for the purpose of increasing thermal conductivity. For this reason, the optimum amounts of aluminum depend partly on caul composition. Cauls cast solely from the filled resin, for example, preferably contain between 50 to 400%, most desirably between 80 to 150% aluminum. Cauls containing the fabric reinforcing sheets preferably contain from 20 to 150%, most desirably 40 to 100% by weight of aluminum.

To assist in curing epoxy resin there may be used, in principle, any known type of curing agent, for example, amines or amides such as aliphatic and aromatic primary and secondary amines, for instance paraphenylenediamine, bis(paraaminophenyl)methane, ethylenediamine, N,N-diethylethylenediamine, diethylenetriamine, tetra(hydroxyethyl)diethylenetriamine, triethylenetetramine, N,N-dimethylpropylenediamine; polyamides, for example, those from aliphatic polyamines and dimerized or trimerized unsaturated fatty acids; polyhydric phenols, for example, resorcinol, bis(4-hydroxyphenyl)dimethylmethane, phenolformaldehyde resins, or especially polybasic carboxylic acids and their anhydrides, for example, phthalic anhydride, tetrahydrophthalic anhydride, hexahydrophthalic anhydride, methylhexahydrophthalic anhydride, endomethylene-tetrahydrophthalic anhydride, methylendomethylene-tetrahydrophthalic anhydride (methyl nadic anhydride), hexachloro-endomethylenetetrahydrophthalic anhydride, succininc anhydride, adipic anhydride, maleic anhydride, allylsuccinic anhydride, dodecenylsuccinic anhydride, 7-allyl-bicyclo(2.2.1)hept-5-ene-2,3-dicarboxylic anhydride; pyromellitic dianhydride or mixtures of such anhydrides. If desired, there may be additionally used curing accelerators, such as tertiary amines, their salts or quaternary ammonium compounds, for example, tris(dimethylaminomethyl)phenol, benzyldimethylamine or benzyl dimethyl ammoniumphenolate, tin (II) salts of carboxylic acids such as tin (II) octoate or alkali metal alcoholates, for example, sodium hexylate.

Further suitable as curing agents are catalytic curing agents that cause polymerization of the epoxy resins, for example, tertiary amines such as benzyldimethylamine, Mannich's bases such as tris(dimethyl)aminomethylphenol, reaction products of aluminum alcoholates or phenolates with compounds of tautomeric reaction of the acetoacetic ester type, Friedel-Crafts catalysts, for example, $AlCl_3$, $SbCl_5$, $SnCl_4$, $ZnCl_2$, $BF_3$ and their complexes with organic compounds such for instance as BF-amine complexes, metal fluoroborates such as zinc fluoroborate; phosphoric acid; boroxines such as trimethoxyboroxine; metal chelate compounds.

The foregoing description encompasses a wide range of individual components which may be combined to compound aluminum-filled epoxy resins. There are, however, a number of ready-to-use, commercially available aluminum-filled epoxy resin casting compounds suitable for use in the practice of this invention. Such casting compounds must be resistant to temperatures normally encountered in plywood production, namely, temperatures up to about 270° to 320° F. Suitable casting compounds include:

Hysol TC-5467 (TH-3831catalyst)
Hysol TC9-5246 (H6-3615 catalyst)
   Hysol Division
   The Dexter Corporation
   Industry, California
Furane 8067 (9216 catalyst)
Furane 8067 (927 catalyst)
   Furane Plastics
   Subsidiary of M & T Chemicals, Inc.
   Los Angeles, California
Devcon C
   Devcon Corporation
   Danvers, Massachusetts
Hexcel Epolite 3353
Hexcel Epolite 3354
   Hexcel Corporation
   Rezolin Division
   Chatsworth, California Of particular significance to this invention, is the viscosity of the uncured, aluminum-filled epoxy resin. In accordance with one aspect of the present invention, a press caul is prepared from a casting of said resin. When poured into a suitable mold, high viscosity resins may entrap air against the textured mold surface, resulting in a caul plate with a defective surface. Therefore, the viscosity of a catalyzed, aluminum filled epoxy resin is preferably less than about 100,000 centipoise, most preferably less than about 50,000 centipoise, when poured into the mold. Although the viscosity of a given aluminum filled epoxy resin may be lowered by heating, this should not be done to a degree which reduces the working life of said resin below about one hour from the time of catalysis. Greater degrees of heating induce difficulties by reducing the time available for pouring and leveling the resin in the mold.

Where the product caul is to be formed with a plurality of reinforcing fabric layers impregnated with an aluminum filled epoxy resin, the viscosity of the catalyzed, aluminum filled epoxy resin desirably does not exceed about 30,000 centipoise and is preferably less than about 15,000 centipoise. This permits a flow of resin sufficient for bonding between the layers of glass fiber cloth and assumption of the relief configuration of the desired textured design. For this aspect, the number of layers of reinforcing fabric to be used in fabricating a caul of, for example, the preferred ¼ inch thickness lies between about 1–10 layers and is preferably 3–6 layers.

Figure 1:
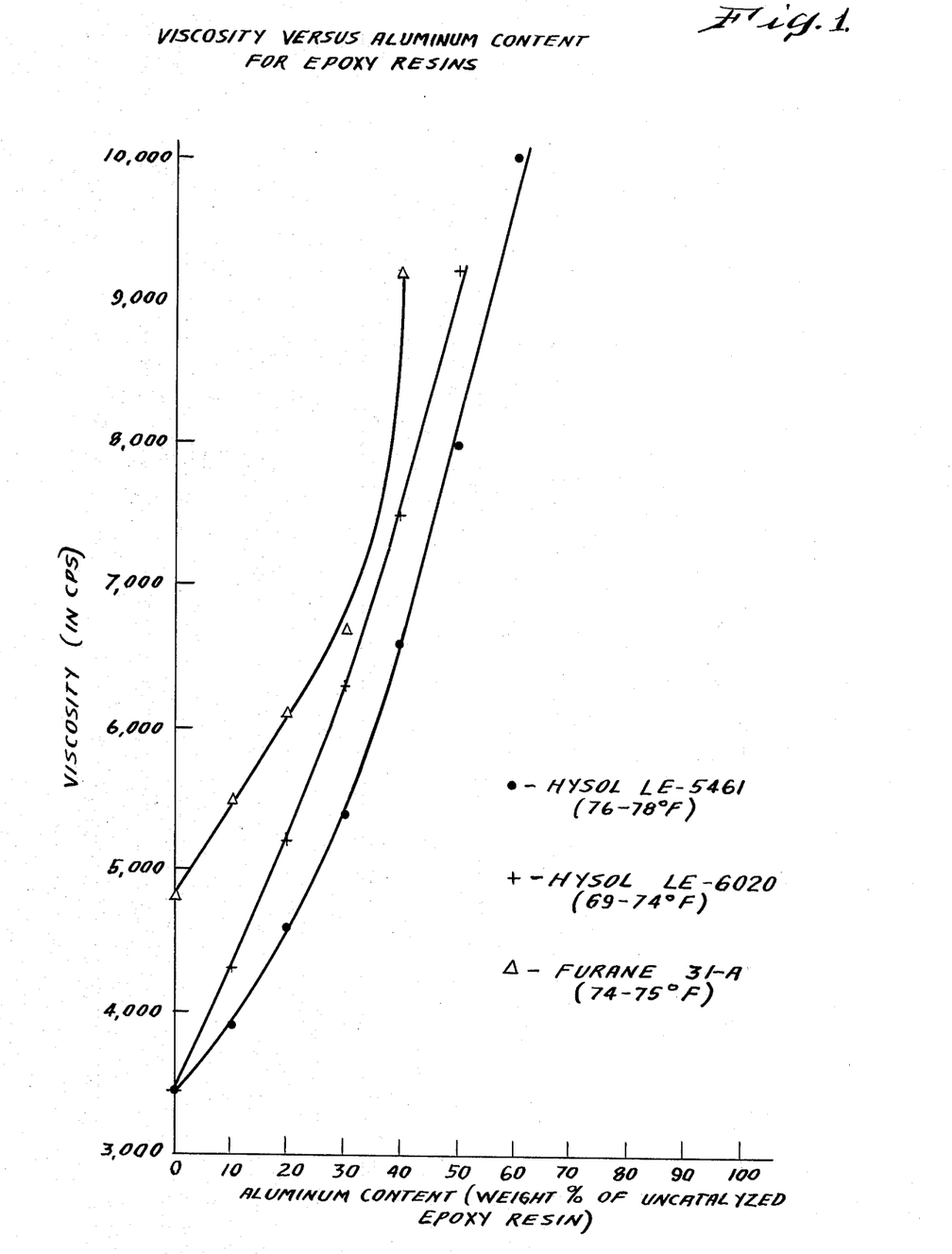
Figure 2:
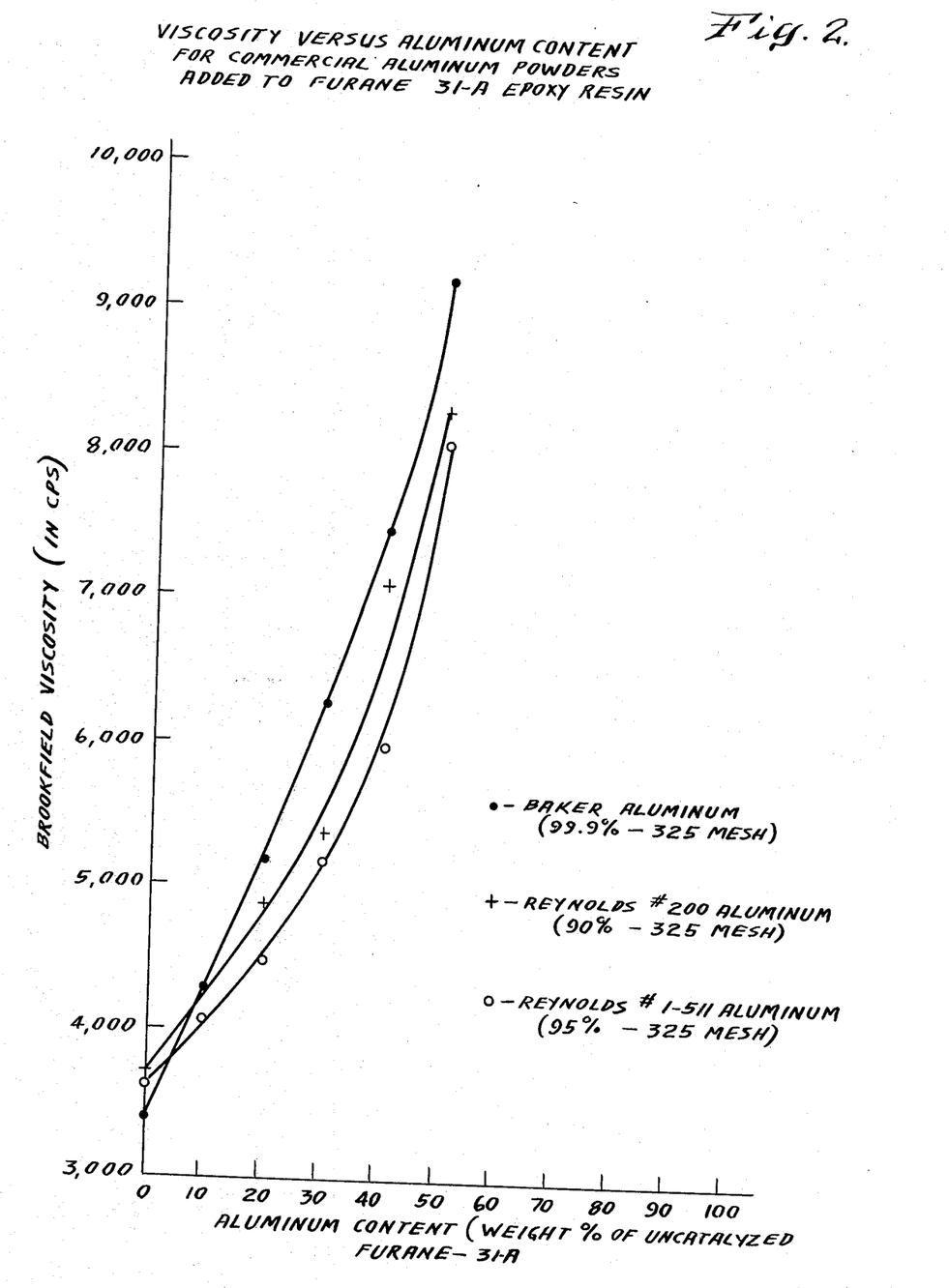

The amount of aluminum powder incorporated in a given epoxy resin has a direct effect on its subsequent viscosity. This relationship is shown in FIGS. 1 and 2. FIG. 1 is a graph plotting uncatalyzed resin viscosity, in centipoise, versus % aluminum content, based upon uncatalyzed resin weight, for three different commercially available epoxy resins. The aluminum powder (99.9%-325 mesh) utilized was from the J. T. Baker Co.

FIG. 2 is a plot of uncatalyzed resin viscosity versus aluminum content for three commercially available aluminum powders added to Furane 31-A epoxy resin, one of the preferred materials for use in the instant invention.

In the practice of this invention, the caul may be either a casting of the aluminum-filled epoxy resin alone or may additionally contain a plurality of fabric layers; the layers being impregnated with the epoxy resin. Optimum cauls composed of these different caul compositions may vary in thickness.

Owing to the weight and heat transfer coefficient of cured resin, it is desirable to minimize the thickness of a caul. At the same time, however, a caul must be sufficiently thick to provide appropriate stiffness during exposure to the temperatures normally encountered in embossing operations—viz. up to about 270°–320° F. This thickness is best chosen having regard both for the other dimensions of the caul and the caul composition.

Both cauls consisting essentially of filled epoxy, where the length and width dimensions of the caul are 50 inches by 100 inches, an appropriate thickness is about ½ of an inch. Where the length and width dimensions are 55 inches by 130 inches, a suitable thickness is about ⅝ of an inch. Optimum dimensions are, however, readily ascertained for each situation by persons skilled in the art.

Where the cauls of this invention include a plurality of glass fiber cloth layers, their chief advantage—compared with cauls consisting of the cast resin alone—is that they are reinforced. Otherwise stated, they can be still thinner, while retaining desirable stiffness. This permits production of cauls with low weight, high strength and improved rate of heat transfer.

Figure 3:
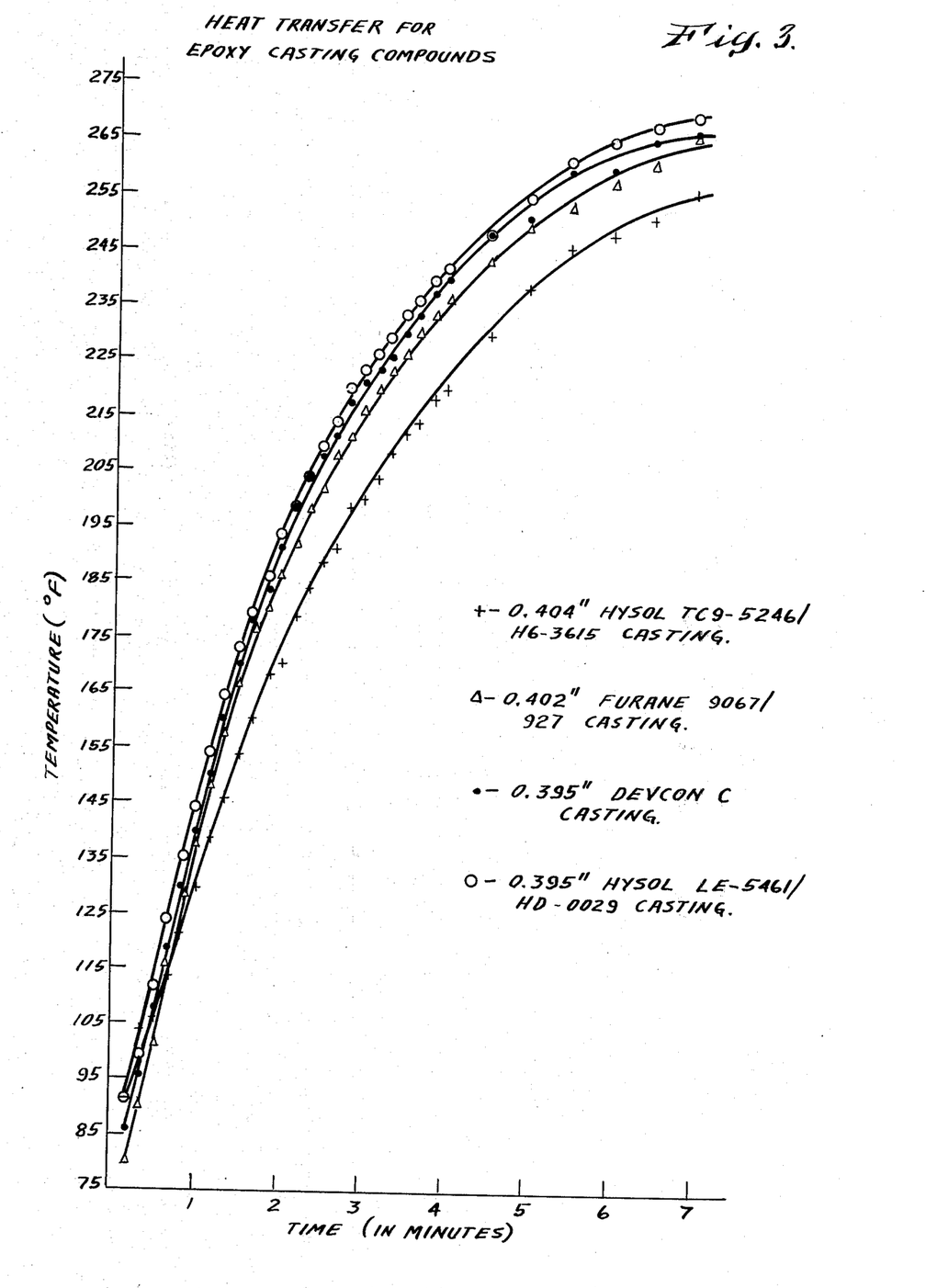
Figure 4:
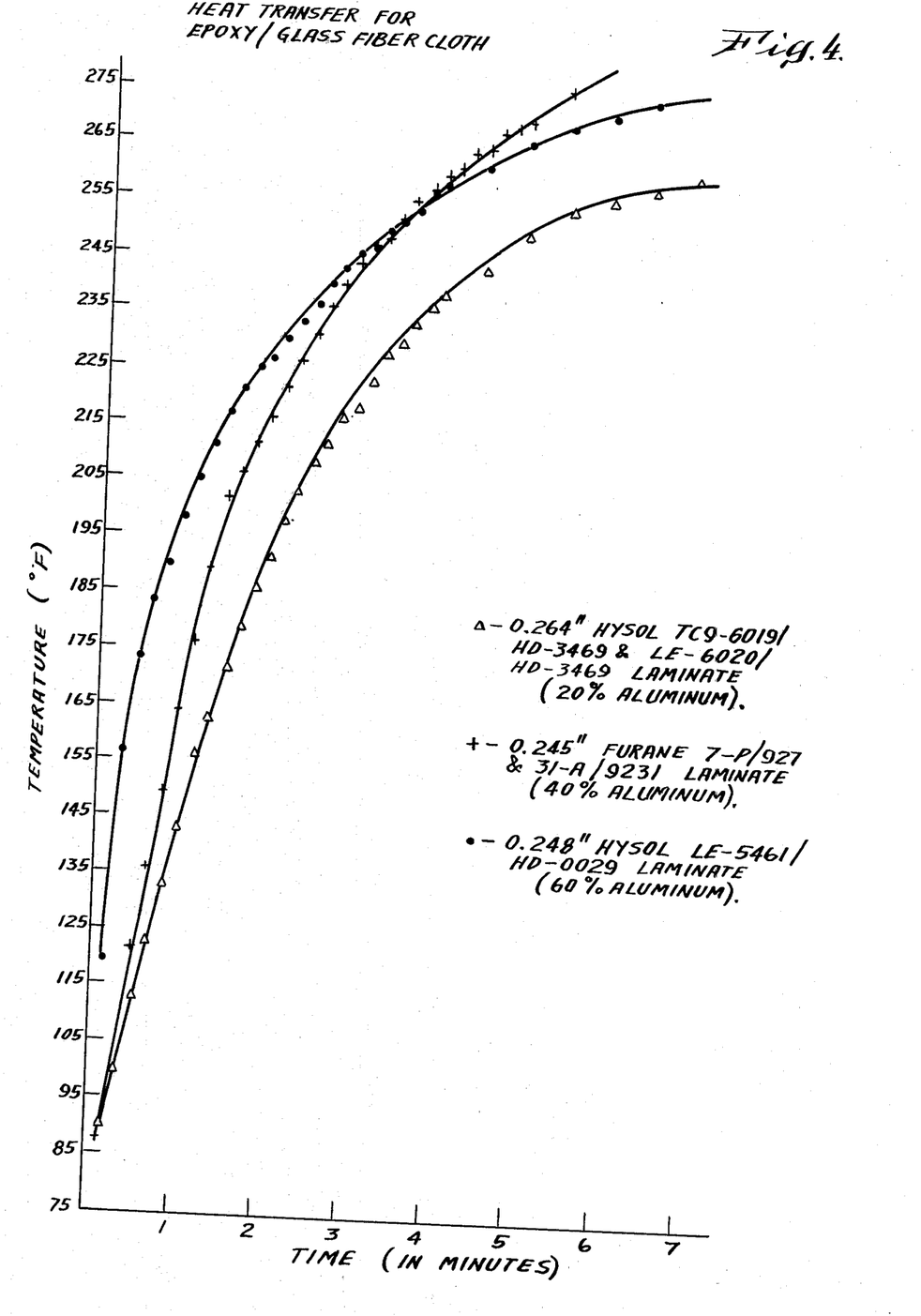

FIGS. 3 and 4 are graphs showing the improved heat transfer properties of filled epoxy resin/glass fiber cloth laminates having a thickness of about ¼ inch (FIG. 4) versus castings of aluminum filled epoxy resins having a thickness of about 4/10 inch (FIG. 3). Both graphs record temperature versus time. For FIG. 3, a thermocouple was placed between the casting and ⅝ inch plywood (both at room temperature) which were then put into a laboratory press at 300° F. and contact pressure. For FIG. 4, all laminates had 5 plies of 520 glass fiber cloth (available from Fiberchem, Inc., Seattle, Washington). A thermocouple was placed between the laminate and ⅝ inch plywood (both at room temperature) which were then put into a laboratory press at 300° F. and contact pressure.

Whether or not the cauls contain impeded reinforcing fabric, the molding and optional baking temperatures necessary for proper resin curing are the same. Suitable temperatures are conventional and vary in known manner dependent upon the particular epoxy resin system used. Ordinarily, however, curing should involve an exposure to between 125° to 300° F. for between 3 to 10 hours. Preferably, a two-step, molding and then baking sequence is utilized. This may, for example, involve an initial cure at 125° to 250° F. for 1 to 10 hours and a final cure at 300° to 500° F. for another 1 to 10 hours.

In the practice of this invention, press cauls are preferably fabricated as actual replicates of grooved and/or textured surfaces which are wooden. In this embodiment, it has been found useful to coat the grooved and/or textured wooden design surfaces with a sealer and, further, to apply a release agent over the sealer. High grade pattern lacquers or varnishes have been successfully used as sealers for said wooden surfaces. Commercially available sealers include: Sherwin-Williams B44V20, a polyurethane varnish; DuPont 1999, a pattern lacquer; and DuPont 1907, a pattern lacquer. As a mold release agent, a product such as DuPont Vydax 550 (a dispersion of a tetrafluoroethylene telomer in trichlorotrifluoroethane solvent) is suitable. Other sealing and releasing agents may, of course, be equally suitable and may be similarly used in connection with this invention.

The ultimate use for the press cauls made according to the various aspects of this invention is to emboss plywood or other wood panel products with a desired grooved and/or textured design. In a preferred embodiment of the present invention, said cauls are used to emboss a texture in panels overlaid with a resin-impregnated paper, during fabrication in a hot press at 175-250 psi and 270°-320° F.

Suitable overlays for the preferred purpose of this invention are conventional. Most desirably, however, these materials are those termed "medium density overlays" by the wood products industry. Such paper overlays consist of a cellulose-fiber sheet or sheets containing not less than 17 percent resin solids for a beater-loaded sheet, or 22 percent for an impregnated sheet, both based on the volatile free weight of resin and fiber exclusive of glueline. The typical resin type used to impregnate such sheets is thermosetting phenol-formadehyde, but other resin types that provide equivalent performance with respect to durability are also acceptable. The resin impregnated paper usually weighs not less than 58 pounds per 1,000 square feet of single face, including both resin and fiber but exclusive of glueline. After application, such materials usually measure not less than 0.012 inch in thickness.

This invention will be better understood by reference to the following examples which are here included for illustrative purpose only and are not to be construed as limitations.

EXAMPLE 1

An embossing caul of dimensions ⅜"-55"×130" was made from a commercial, aluminum-filled epoxy resin. A mold was fabricated from a textured hardboard siding panel (Dee Sundance pattern). This panel was sealed with several coats of Sherwin-Williams Heavy Duty Varnish (B44V20), fastened to a level support frame assembly, and coated with DuPont Vydax 550 release agent.

Furane 8067 casting resin was preheated to about 80°-90° F. before mixing with Furane 927 catalyst. This lowered the viscosity of the catalyzed resin to a more workable level of about 45,000 centipose (@90° F.). Approximately 175 pounds of resin and 10 pounds of catalyst were poured slowly into the mold. The initial cure (i.e. gelling) of the caul required about 4-5 hours at a temperature of about 150° F. After initial cure, the caul was baked at 350° F. for 8 hours to develop maximum strength and temperature resistance.

The finished embossing caul was installed in a 4'×10' plywood hot press and heated for a period of about 10 minutes. A series of Douglas-fir veneers were glued and assembled into five-ply ⅝--4'×8' panels, each panel including a sheet of a resin-impregnated paper (Crown Zellerbach HI-BOND) as an overlay on the top surface. The panels were then pressed at 200 psi and a temperature of 285°-295° F. for decreasing times of 10, 9, 8 and finally 7 minutes. All overlaid plywood panels exhibited good texture definition resulting from contact with the embossing caul.

Figure 5:
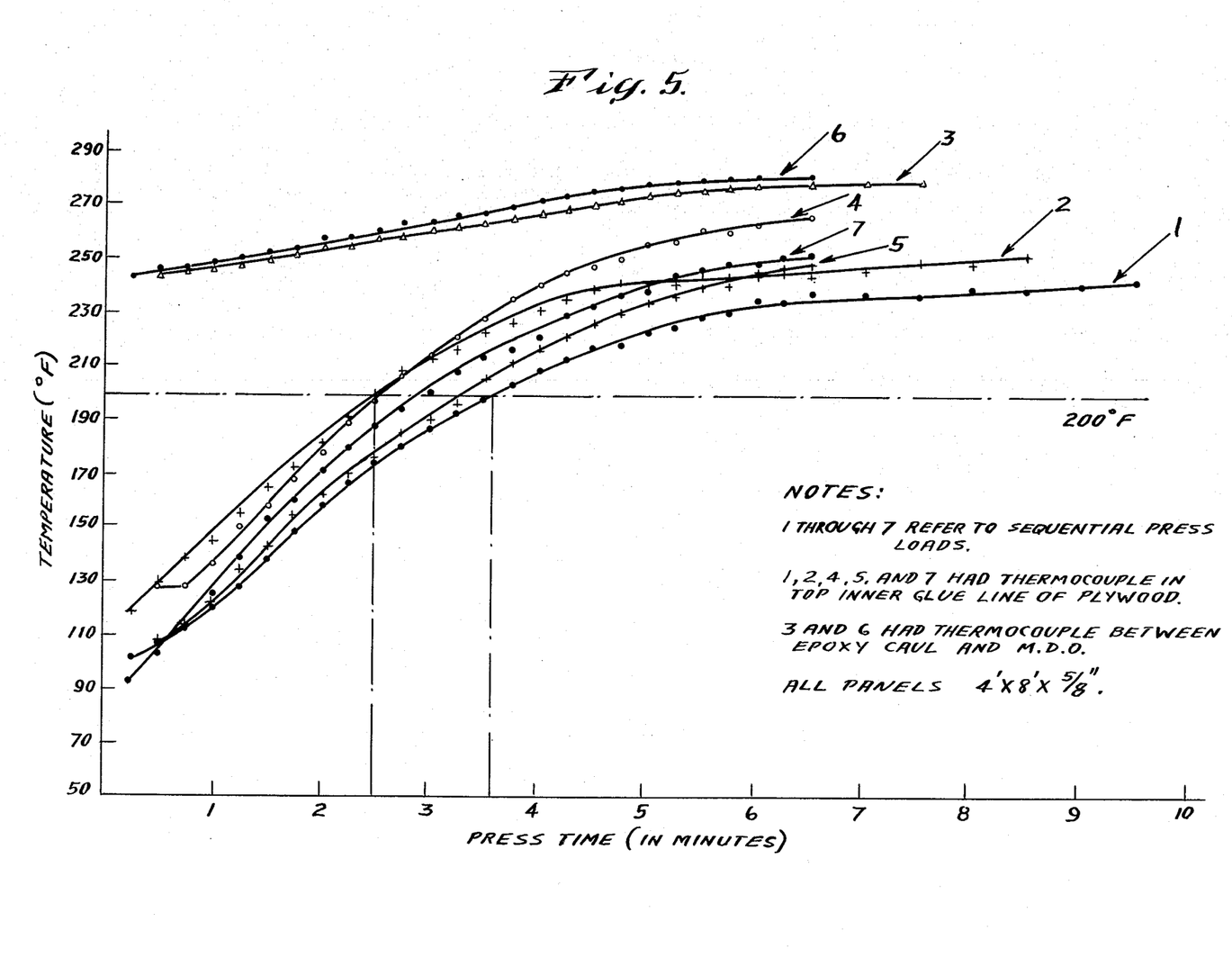

Thermocouples were used to monitor heat transfer through the caul plate, generating data for the plots of press time (in minutes) versus press temperature (in °F.) shown in FIG. 5. The numbers on the graph plots refer to sequential press loads of plywood. Numbers 1, 2, 4, 5 and 7 refer to press loads in which the thermocouple was placed in the top inner glueline of a plywood panel during embossing. Numbers 3 and 6 refer to press loads in which the thermocouple was placed between the embossing caul and the resin impregnated paper overlay on a plywood panel. These plots show that the inner glueline of the plywood had sufficient time at a temperature above 200° F. to provide for an adequate cure of the plywood adhesive, even when the press time was reduced to 7 minutes.

EXAMPLE 2

The procedure described in Example 1 was repeated with the exception that the mold pattern board was made from plywood. Five-ply ⅝" thick Douglas-fir plywood panels of "N" grade face were cut to dimensions of 55-½×131" and abraded with a wire brush to produce textured surfaces for use in the caul molds.

EXAMPLE 3

The procedure described in Example 1 was repeated with the exception that cauls of dimensions ⅜"-3"×6" were made from casting materials compounded from commercially available, unfilled epoxy resins, to which were added varying amounts of powdered aluminum. The composition of filled resin was: 1 part Hysol LE-5461 epoxy resin, 0.8 parts Baker aluminum powder (99.9% through 325 mesh), and 0.08 part Hysol HD-0029 catalyst. The aluminum powder was added to the LE-5461 epoxy resin under agitation. Once catalyzed, the resulting casting compound had a viscosity of 7,100 centipoise (@83° F.), allowing this material to be poured into a suitable mold and leveled easily without entrapping air.

The cure schedule used was as described in Example 1.

EXAMPLE 4

Laboratory-scale cauls were made as described in Example 3 with the exception that several layers of glass fiber cloth were used in combination with an aluminum filled epoxy resin to improve caul strength. These cauls were ¼"-3"×6" and contained five layers of 520 glass fiber cloth (Fiberchem Inc., Seattle, Washington) utilized for strength.

Several commercially available, unfilled epoxy laminating resins were compounded with powdered aluminum to produce formulations suitable for impregnating glass fiber cloth and, upon curing, capable of providing improved heat transfer properties. The compounds used were:

| | |
|---|---|
| Furane 31-A laminating resin- 1 part | Initial viscosity = 14,200 cps (74° F.) |
| Baker powdered aluminum- 0.4 part | |
| Furane 9231 catalyst- 0.2 part | |
| Hysol LE-5461 laminating resin- 1 part | Initial viscosity = 7,200 cps (76° F.) |
| Baker powdered aluminum- 0.6 part | |
| Hysol HD-0029 catalyst- 0.08 part | |

These laminating compounds were low enough in viscosity to permit impregnation of glass fiber cloth and subsequent lay-up of the layers of impregnated cloth in a suitable mold. The cure schedule used for these cauls was as described in Example 1.

In summary the subject invention provides a new and improved caul for embossing textures in wood surfaces, and a method for forming said caul. The caul of the subject invention may be made from filled epoxy resins either alone or in combination with embedded reinforcing fabric sheets.

The various plastic caul configurations of the subject invention are all significantly less expensive to manufacture (with respect to both material used and actual processing) than metal cauls produced by aforementioned techniques. As a result of the cheaper costs, manufacturers may afford many different cauls, thus exploiting the many designs that are available for use. Aside from the economic standpoint, the cauls formed in accordance with the subject invention are very realistic reproductions of wood surfaces because they may be formed against actual textured wood surfaces. This is in contrast with metal cauls which are formed by most techniques. In addition, all the cauls formed in accordance with the subject invention are significantly lighter than the metallic cauls currently available. This results in easier and safer handling, especially during installation and removal from a hot press.

Finally, the surface composition of the subject cauls permits them to be recycled for further use. This may be done by removing the applied texture (by sanding or similar mechanical means) and then reapplying a new texture design. This reapplication is performed in a manner similar to the method already discussed. Thus, either an amount of filled epoxy resin, or one or more plies of fabric sheeting impregnated with filled epoxy resin are placed in a suitable mold constructed of a textured design panel. The smooth surface of the old caul is then placed against the uncured resin or uncured resin/fabric sheeting composite in the mold. Then, this assembly is heated to cure at least partially before the product caul is removed from the mold for further curing (if required) and use.

In essence, therefore, the present cauls are susceptible to replacement of their texture-containing surface (or alternatively, the opposite side of the caul could be provided with a new texture-containing surface). This characteristic still further increases the utility of the present cauls while reducing their cost by permitting conservation of their materials through reuse.

Although the foregoing invention has been described chiefly in terms of forming a caul having a relief texture taken from a natural wood surface, it is understood that reliefs of other surfaces may also be made. Thus, for example, filled epoxy cauls of the present invention could be formed against metal or cast surfaces having a desirable design texture.

Having described the subject invention with reference to the presently preferred embodiments thereof, it will be apparent to those skilled in the art that many changes and modifications may be made without departing from the spirit of the invention. Accordingly, it is intended that all matter contained in the above description or shown in the accompanying drawings shall be interpreted as illustrative and not in a limiting sense.

What is claimed is:

1. A method for forming a high-strength, temperature resistant caul capable of embossing a textured surface onto a preformed panel, overlaid with a resin impregnated paper, at temperatures of from 270° to 320° F. and pressures of from 175 to 250 psi, comprising the steps of:
   forming a mold from a textured hardboard panel;
   applying a sealer to the panel;
   coating the sealed panel with a release agent;
   preheating an aluminum filled epoxy resin to approximately 80°-90° F., said resin having a viscosity no higher than about 100,000 centipoise at room temperature;
   impregnating at least one layer of glass fiber cloth with said preheated resin admixed with a catalyst, the ratio of resin to catalyst being approximately 17.5 to 1 respectively;
   placing said layer of catalyzed resin impregnated glass fiber cloth in said mold;
   pouring additional preheated catalyzed resin onto said mold containing said catalyzed resin impregnated fiberglass cloth layer;
   partially curing the caul formed from the catalyzed resin for approximately 4 to 5 hours at a temperature of about 150° F., such that the caul assumes the relief configuration of the textured panel; and
   baking the caul for about 8 hours at a temperature of approximately 350° F. such that the caul is fully cured and the configuration of the textured panel assumed by the caul is permanently maintained.

2. A method as recited in claim 1 in which the composition of the resin, by weight, is a 1 part epoxy resin and 8 parts aluminum powder.

3. A method as recited in claim 1 in which filled resin has a viscosity no higher than about 30,000 centipoise at room temperature.

4. A method as recited in claim 1 in which said aluminum has a particle size of about 3-50 microns and is present in an amount of 50-400 weight percent based on the weight of the uncured epoxy resin.

5. A method as recited in claim 4 in which said aluminum has a particle size of 5-20 microns and is present in an amount of 80-150 percent based on the weight of the uncured epoxy resin.

6. A method as claimed in claim 3 in which up to 10 layers of glass fiber cloth are impregnated with resin before putting the resin and layers on the mold and in which the amount of aluminum is 20–150 percent based on the weight of the uncured epoxy resin.

7. A method as recited in claim 6 in which 3–6 layers of glass fiber cloth are impregnated, the amount of said aluminum is 40–100 percent based on the weight of the uncured epoxy resin, the uncured epoxy resin has a viscosity no higher than about 15,000 centipoises at room temperature and said aluminum has a 5–20 micron particle size.

* * * * *